US010690073B2

(12) United States Patent
Nakada et al.

(10) Patent No.: US 10,690,073 B2
(45) Date of Patent: Jun. 23, 2020

(54) EXHAUST PURIFICATION SYSTEM AND CATALYST REGENERATION METHOD

(71) Applicant: ISUZU MOTORS LIMITED, Tokyo (JP)

(72) Inventors: Teruo Nakada, Yokohama (JP); Takayuki Sakamoto, Fujisawa (JP); Daiji Nagaoka, Kamakura (JP); Tomohiro Korenaga, Fujisawa (JP)

(73) Assignee: ISUZU MOTORS LIMITED, Shinagawa-Ku, Tokyo (JP)

( * ) Notice: Subject to any disclaimer, the term of this patent is extended or adjusted under 35 U.S.C. 154(b) by 294 days.

(21) Appl. No.: 15/555,448

(22) PCT Filed: Feb. 25, 2016

(86) PCT No.: PCT/JP2016/055614
§ 371 (c)(1),
(2) Date: Sep. 1, 2017

(87) PCT Pub. No.: WO2016/140134
PCT Pub. Date: Sep. 9, 2016

(65) Prior Publication Data
US 2018/0030911 A1  Feb. 1, 2018

(30) Foreign Application Priority Data
Mar. 3, 2015  (JP) ................. 2015-041798

(51) Int. Cl.
F01N 3/20 (2006.01)
F02D 41/02 (2006.01)
(Continued)

(52) U.S. Cl.
CPC ........... F02D 41/0285 (2013.01); F01N 3/20 (2013.01); F02D 41/024 (2013.01);
(Continued)

(58) Field of Classification Search
CPC .... F01N 3/20; F01N 2260/04; F01N 2390/02; F01N 2430/06; F01N 2570/14;
(Continued)

(56) References Cited

U.S. PATENT DOCUMENTS 5,832,722 A   11/1998 Cullen et al.
2002/0023431 A1*  2/2002 Takemura ............... F02D 37/02
                                                    60/284

(Continued)

FOREIGN PATENT DOCUMENTS

DE  102004026823 A1  1/2005
DE  102008059698 A1  6/2010

(Continued)

OTHER PUBLICATIONS

Office Action for related CN App No. 201680013170.0 dated Jan. 31, 2019, 11 pgs.

(Continued)

Primary Examiner — Matthew T Largi
(74) Attorney, Agent, or Firm — Procopio, Cory, Hargreaves & Savitch LLP

(57) ABSTRACT

An exhaust purification system includes: an NOx reduction type catalyst; an MAF sensor; an SOx purge control unit that uses an air system control having an intake air amount feedback-controlled based on a target intake air amount and an injection system control for a target injection increase amount set based on the target intake air amount, and a fuel injection amount feedback-controlled based on the target injection increase amount; an SOx purge prohibition processing unit that prohibits an SOx purge control; and a warming mode control unit that open-loop controls an air system when the SOx purge control is prohibited, controls the fuel injection amount, and maintains the exhaust gas at a temperature. The SOx purge control unit executes the (Continued)

injection system control by switching the target intake air amount into an actual intake air amount when starting the SOx purge control after a warming mode control is ended.

4 Claims, 12 Drawing Sheets

(51) Int. Cl.
*F02D 41/04* (2006.01)
*F02D 45/00* (2006.01)
*F01N 3/36* (2006.01)
*F01N 3/08* (2006.01)
*F02D 41/14* (2006.01)

(52) U.S. Cl.
CPC ......... *F02D 41/0235* (2013.01); *F02D 41/04* (2013.01); *F02D 45/00* (2013.01); *F01N 3/0814* (2013.01); *F01N 3/0842* (2013.01); *F01N 3/0871* (2013.01); *F01N 3/0885* (2013.01); *F01N 3/206* (2013.01); *F01N 3/2006* (2013.01); *F01N 3/36* (2013.01); *F01N 2260/04* (2013.01); *F01N 2390/02* (2013.01); *F01N 2430/06* (2013.01); *F01N 2570/14* (2013.01); *F01N 2610/03* (2013.01); *F01N 2610/146* (2013.01); *F01N 2900/08* (2013.01); *F01N 2900/1602* (2013.01); *F01N 2900/1612* (2013.01); *F01N 2900/1614* (2013.01); *F01N 2900/1821* (2013.01); *F02D 41/1454* (2013.01); *Y02A 50/2344* (2018.01)

(58) Field of Classification Search
CPC ........... F01N 2610/03; F01N 2610/146; F01N 2900/08; F01N 2900/1602; F01N 2900/1612; F01N 2900/1614; F01N 2900/1821; F01N 3/0814; F01N 3/0842; F01N 3/0871; F01N 3/0885; F01N 3/2006; F01N 3/206; F01N 3/36; F02D 41/0235; F02D 41/024; F02D 41/0285; F02D 41/04; F02D 45/00; F02D 41/1454
See application file for complete search history.

(56) References Cited

U.S. PATENT DOCUMENTS

| | | | |
|---|---|---|---|
| 2005/0014978 A1* | 1/2005 | Nagaoka | ................... B01J 38/02 568/662 |
| 2005/0050881 A1 | 3/2005 | Toshioka et al. | |
| 2005/0112046 A1 | 5/2005 | Nagaoka et al. | |
| 2006/0248878 A1 | 11/2006 | Tonetti et al. | |
| 2007/0000237 A1 | 1/2007 | Toshioka et al. | |
| 2008/0109146 A1 | 5/2008 | Wang et al. | |
| 2009/0019836 A1* | 1/2009 | Nagaoka | ................ F01N 3/0253 60/285 |
| 2009/0049824 A1 | 2/2009 | Kojima et al. | |
| 2009/0077947 A1* | 3/2009 | Nagaoka | ............ B01D 53/9495 60/284 |
| 2009/0077950 A1 | 3/2009 | Aoyama et al. | |

FOREIGN PATENT DOCUMENTS

| | | |
|---|---|---|
| EP | 1479900 A1 | 11/2004 |
| JP | 2004-339993 A | 12/2004 |
| JP | 2005-226463 A | 8/2005 |
| JP | 2005226463 A | 8/2005 |
| JP | 2006-312933 A | 11/2006 |
| JP | 2008-202425 A | 9/2008 |
| JP | 2009-047086 A | 3/2009 |
| JP | 2012-510025 A | 4/2012 |

OTHER PUBLICATIONS

International Search Report and Written Opinion for PCT App No. PCT/JP2016/055614 dated May 24, 2016, 9 pgs.
Extended European Search Report for related EP App No. 16758828.4 dated Jul. 3, 2018, 10 pgs.

* cited by examiner

FIG. 6

| | FILTER REGENERATION CONTROL | WARMING MODE CONTROL | SOx PURGE LEAN CONTROL | SOx PURGE RICH CONTROL | CONDITIONS |
|---|---|---|---|---|---|
| PATTERN A | $F_{DPF}=0$ ○ | $F_{SPK}=1$ ● | | | OUT OF SOx PURGE ALLOWABLE RANGE |
| PATTERN B | $F_{DPF}=0$ ○ | $F_{SPK}=0$ ○ | $F_{SP}=1$ ● | | WITHIN SOx PURGE ALLOWABLE RANGE |
| PATTERN C | | | $F_{SPR}=0$ ○ | $F_{SPR}=1$ ● | WITHIN SOx PURGE ALLOWABLE RANGE |
| PATTERN D | | $F_{SPK}=1$ ● | $F_{SP}=0$ ○ | | OUT OF SOx PURGE ALLOWABLE RANGE |

…

EXHAUST PURIFICATION SYSTEM AND CATALYST REGENERATION METHOD

CROSS-REFERENCE TO RELATED APPLICATIONS

This application is a U.S. National Stage entry of PCT Application No. PCT/JP2016/055614, filed on Feb. 25, 2016, which claims priority to Japanese Patent Application No. 2015-041798, filed Mar. 3, 2015, the contents of which are incorporated herein by reference.

TECHNICAL FIELD

The present invention relates to an exhaust purification system and a catalyst regeneration method.

BACKGROUND ART

In the related art, an NOx occlusion reduction type catalyst is known as a catalyst which reduces and purifies a nitrogen compound (NOx) in an exhaust gas discharged from an internal combustion engine. When the exhaust gas is under a lean atmosphere, the NOx occlusion reduction type catalyst occludes the NOx contained in the exhaust gas. When the exhaust gas is under a rich atmosphere, the NOx occlusion reduction type catalyst detoxifies the occluded NOx through reducing and purifying by hydrocarbon contained in the exhaust gas, and discharges the NOx. For this reason, in a case where the NOx occlusion amount of the catalyst reaches a predetermined amount, in order to recover NOx occlusion capacity, it is necessary to regularly perform a so-called NOx purge which makes the exhaust gas be in a rich state by a post injection or an exhaust pipe injection (for example, see JP-A-2008-202425).

In the NOx occlusion reduction type catalyst, a sulfur oxide contained in the exhaust gas (hereinafter, referred to as SOx) is also occluded. When the SOx occlusion amount increases, the NOx purification capacity of the NOx occlusion reduction type catalyst is reduced, which is problematic. For this reason, in a case where an SOx occlusion amount reaches a predetermined amount, in order that the SOx is desorbed from the NOx occlusion reduction type catalyst to recover the NOx occlusion reduction type catalyst from S-poisoning, it is necessary to regularly perform the so-called SOx purge in which an unburned fuel is supplied to an upstream-side oxidation catalyst by the post injection or the exhaust pipe injection to raise an exhaust temperature to an SOx desorption temperature (for example, see JP-A-2009-047086).

SUMMARY OF THE INVENTION

Technical Problem

As such a type of device, there is known a device in which an SOx purge is executed using in combination both of an air system control for reducing an intake air amount and an injection system control for increasing a fuel injection amount. As an example of the air system control to be executed, the target intake air amount is obtained from a first target excess air ratio (for example, about 1.3) set based on an operating state of an engine, and the intake air amount is feedback-controlled based on the target intake air amount. Further, as an example of the injection system control to be executed, a target injection increase amount is obtained from a second target excess air ratio (for example, about 0.9) set based on the operating state of the engine and the target intake air amount described above, and an exhaust pipe injection amount or a post injection amount is feedback-controlled based on the target injection increase amount.

By the way, it is desirable to prohibit or interrupt the execution of the SOx purge when a predetermined prohibition condition such as a sudden rise of the engine speed during the SOx purge is established. However, since a catalyst temperature decreases when post injection or exhaust pipe injection is completely stopped, the large amount of fuel is consumed at the time of re-starting of the SOx purge, resulting in an excessive temperature rise of catalyst or deterioration of fuel consumption. Therefore, during the prohibition or interruption of the SOx purge, it is desirable to execute a warming mode for keeping a catalyst temperature in a desired high temperature state lower than the SOx desorption temperature by switching the air system control into an open loop control and performing continuously the post injection or exhaust pipe injection at the predetermined injection amount.

By the way, when the prohibition condition of the SOx purge is not established during the warming mode and the SOx purge is re-started, the air system is switched from the open loop control to the feedback control. For this reason, even when the air system control is executed based on the target intake air amount as described above, the actual intake air amount does not follow up the target intake air amount for a predetermined period after the restart of the SOx purge. In such a state, even when the injection system control using the injection increase amount set from the target intake air amount is executed, there is also a problem that an excess air ratio of the exhaust gas is not effectively lowered to the second target excess air ratio necessary for the SOx purge. As a result, the time required for the SOx purge is prolonged, and thus there is a possibility that deterioration of fuel consumption or catalyst heat deterioration due to an excessive temperature rise of the exhaust gas may occur.

An object of the exhaust purification system and the catalyst regeneration method according to the present disclosure is to effectively suppress prolongation of the time required for the SOx purge, thereby preventing the fuel consumption deterioration or the excessive temperature rise of the exhaust gas.

Solution to Problem

An exhaust purification system according to this disclosure includes: an NOx occlusion reduction type catalyst that is provided in an exhaust passage of an internal combustion engine to purify a nitrogen compound in an exhaust gas; an intake air amount detecting unit that detects an actual intake air amount of the internal combustion engine; a catalyst regeneration control unit that performs an SOx purge control for recovering the NOx occlusion reduction type catalyst from SOx-poisoning, using in combination both of: an air system control in which a target intake air amount necessary for lowering the exhaust gas to a predetermined first target excess air ratio is set based on an operating state of the internal combustion engine and the intake air amount of the internal combustion engine is feedback-controlled based on the target intake air amount; and an injection system control in which a target injection increase amount necessary for lowering the exhaust gas to a predetermined second target excess air ratio is set based on the target intake air amount and a fuel injection amount is feedback-controlled based on the target injection increase amount; a prohibition unit that prohibits execution of the SOx purge control according to the operating state of the internal combustion engine; and a catalyst warming control unit that executes a catalyst warming control in which an air system of the internal combustion engine is open-loop controlled during a period in which the SOx purge control is prohibited by the prohibition unit, the fuel injection amount is controlled, and thus the exhaust gas is maintained at a predetermined temperature, wherein the catalyst regeneration control unit executes the injection system control by switching the target intake air amount used for setting the target injection increase amount into an actual intake air amount detected by the intake air amount detecting unit when starting the SOx purge control from a state where the catalyst warming control is not executed.

An exhaust purification system according to this disclosure includes: an NOx occlusion reduction type catalyst that is disposed in an exhaust passage of an internal combustion engine to occlude and reduce a nitrogen compound contained in an exhaust gas discharged from the internal combustion engine; a control unit that controls an air-fuel ratio of the exhaust gas discharged from the internal combustion engine; and an air flow sensor that detects an actual intake air amount of the internal combustion engine, wherein the control unit operates to execute a series of process including:

a catalyst regeneration process which performs an SOx purge control for recovering the NOx occlusion reduction type catalyst from SOx-poisoning, using in combination both of: an air system control in which a target intake air amount, which is an intake air amount, necessary for lowering the exhaust gas to a predetermined first target excess air ratio is set based on an operating state of the internal combustion engine and the intake air amount of the internal combustion engine is feedback-controlled based on the target intake air amount; and an injection system control in which a target injection increase amount, which is an increase amount up to a fuel injection amount, necessary for lowering the exhaust gas to a predetermined second target excess air ratio is set based on the target intake air amount and a fuel injection amount is feedback-controlled based on the target injection increase amount;

a prohibition process that prohibits execution of the SOx purge control according to the operating state of the internal combustion engine; and a catalyst warming process that executes a catalyst warming control in which an air system of the internal combustion engine is open-loop controlled during a period in which the SOx purge control is prohibited by the prohibition process, a fuel injection amount is controlled, and thus the exhaust gas is maintained at a predetermined temperature, and wherein when the catalyst regeneration process is executed, the control unit executes the injection system control by switching the target intake air amount used for setting the target injection increase amount into an actual intake air amount detected by the air flow sensor when starting the SOx purge control from a state where the catalyst warming control is not executed.

In an exhaust purification system including an NOx occlusion reduction type catalyst that is disposed in an exhaust passage of an internal combustion engine to occlude and reduce a nitrogen compound contained in an exhaust gas discharged from the internal combustion engine, a catalyst regeneration method according to this disclosure includes: a catalyst regeneration process which performs an SOx purge control for recovering the NOx occlusion reduction type catalyst from SOx-poisoning, using in combination both of: an air system control in which a target intake air amount, which is an intake air amount, necessary for lowering the exhaust gas to a predetermined first target excess air ratio is set based on an operating state of the internal combustion engine and the intake air amount of the internal combustion engine is feedback-controlled based on the target intake air amount; and an injection system control in which a target injection increase amount, which is an increase amount up to a fuel injection amount, necessary for lowering the exhaust gas to a predetermined second target excess air ratio is set based on the target intake air amount and a fuel injection amount is feedback-controlled based on the target injection increase amount; a prohibition process that prohibits execution of the SOx purge control according to the operating state of the internal combustion engine; and a catalyst warming process that executes a catalyst warming control in which an air system of the internal combustion engine is open-loop controlled during a period in which the SOx purge control is prohibited by the prohibition process, the fuel injection amount is controlled, and thus the exhaust gas is maintained at a predetermined temperature, wherein when the catalyst regeneration process is executed, the injection system control is executed by switching the target intake air amount used for setting the target injection increase amount into an actual intake air amount detected by an air flow sensor when starting the SOx purge control from a state where the catalyst warming control is not executed.

Advantageous Effects of the Invention

According to the exhaust purification system and the catalyst regeneration method of the present disclosure, it is possible to effectively suppress prolongation of the time required for the SOx purge, thereby preventing fuel consumption deterioration or an excessive temperature rise of the exhaust gas.

BRIEF DESCRIPTION OF THE DRAWINGS

FIG. 6 is an explanatory diagram of a prohibition process of the SOx purge control according to the embodiment.

DESCRIPTION OF EMBODIMENTS

Hereinafter, an exhaust purification system according to one embodiment of the present disclosure will be described based on accompanying drawings.

Figure 1:
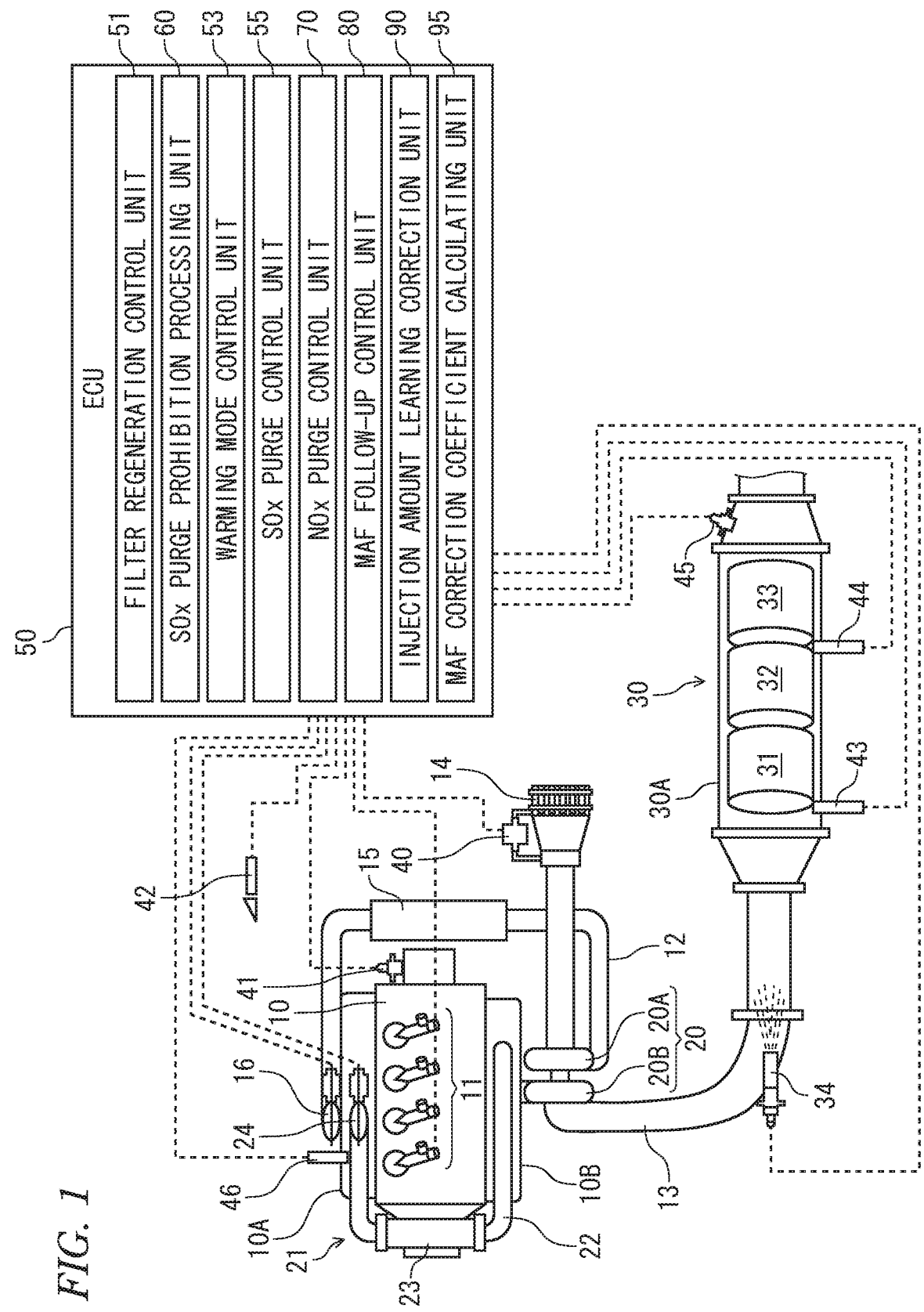
FIG. 1 is an entire configuration diagram illustrating an exhaust purification system according to an embodiment of the present disclosure.

As illustrated in FIG. 1, an injector 11 which directly injects high pressure fuel accumulated in a common rail (not illustrated) into a cylinder is provided in each of cylinders of a diesel engine (hereinafter, simply referred to as an engine) 10. The fuel injection amount or the fuel injection timing of the injector 11 is controlled in response to an instruction signal input from an electronic control unit (hereinafter, referred to as ECU) 50.

An intake manifold 10A of the engine 10 is connected with an intake passage 12 which introduces fresh air therein, and an exhaust manifold 10B is connected with an exhaust passage 13 which derives an exhaust gas outside. An air cleaner 14, an intake air amount sensor (hereinafter, referred to as an MAF sensor) 40, a compressor 20A of a variable capacity supercharger 20, an intercooler 15, an intake throttle valve 16, and the like are provided in order from an intake upstream side in the intake passage 12. A turbine 20B of the variable capacity supercharger 20, an exhaust post-treatment device 30, and the like are provided in order from an exhaust upstream side in the exhaust passage 13. The engine 10 is attached with an engine speed sensor 41, an accelerator opening sensor 42, and a boost pressure sensor 46.

In the description of the embodiment, an MAF sensor 40 for measuring and detecting the mass air flow is used as the intake air amount sensor for measuring and detecting the intake air amount (suction air flow) of the engine, but a different type of air flow sensor from the MAF sensor 40 or a unit substituted for the air flow sensor may be used as long as it can measure and detect the suction air flow of the engine.

An EGR (Exhaust Gas Recirculation) device 21 includes an EGR passage 22 which connects the exhaust manifold 10B and the intake manifold 10A, an EGR cooler 23 which cools an EGR gas, and an EGR valve 24 which adjusts an EGR amount.

The exhaust post-treatment device 30 is configured such that an oxidation catalyst 31, an NOx occlusion reduction type catalyst 32, and a particulate filter (hereinafter, simply referred to as a filter) 33 are disposed in order from the exhaust upstream side in a case 30A. An exhaust pipe injection device 34 which injects an unburned fuel (mainly, hydrocarbon (HC)) into the exhaust passage 13 in response to the instruction signal input from an ECU 50 is provided in the exhaust passage 13 on the upstream side from the oxidation catalyst 31.

For example, the oxidation catalyst 31 is formed by carrying an oxidation catalyst component on a ceramic carrier surface such as a honeycomb structure. When an unburned fuel is supplied by the post injection of the exhaust pipe injection device 34 or the injector 11, the oxidation catalyst 31 oxidizes the unburned fuel to raise the exhaust temperature.

For example, the NOx occlusion reduction type catalyst 32 is formed by carrying an alkali metal and the like on a ceramic carrier surface such as a honeycomb structure. The NOx occlusion reduction type catalyst 32 occludes NOx in the exhaust gas when an exhaust air fuel ratio is in a lean state, and reduces and purifies the occluded NOx by a reducing agent (HC and the like) contained in the exhaust gas when the exhaust air fuel ratio is in a rich state.

For example, the filter 33 is formed such that a plurality of cells sectioned by porous partition walls are disposed in a flowing direction of the exhaust gas, and the upstream side and the downstream side of the cells are sealed alternately. In the filter 33, PM in the exhaust gas is collected in a pore or a surface of the partition wall, and when the estimation amount of PM deposition reaches a predetermined amount, the so-called filter-forced regeneration is performed which combusts and removes the PM. The filter-forced regeneration is performed in such a manner that the unburned fuel is supplied to the oxidation catalyst 31 on the upstream side by an exhaust pipe injection or the post injection, and the temperature of the exhaust gas flowing in the filter 33 is raised to a PM combusting temperature.

A first exhaust temperature sensor 43 is provided, on the upstream side from the oxidation catalyst 31, and detects the temperature of the exhaust gas flowing in the oxidation catalyst 31. A second exhaust temperature sensor 44 is provided between the oxidation catalyst 31 and the NOx occlusion reduction type catalyst 32, and detects the temperature of the exhaust gas flowing in the NOx occlusion reduction type catalyst 32. An NOx/lambda sensor 45 is provided on the downstream side from the filter 33, and detects an NOx value and a lambda value of the exhaust gas passing through the NOx occlusion reduction type catalyst 32 (hereinafter, referred to as an excess air ratio).

The ECU 50 performs various controls on the engine 10 and the like, and includes a well-known CPU or a ROM, a RAM, an input port, an output port, and the like. In order to perform the various controls, the sensor values of the sensors 40 to 46 are input to the ECU 50. The ECU 50 includes a filter regeneration control unit 51, an SOx purge control unit 60, an SOx purge prohibition processing unit 53, a warming mode control unit 55, an NOx purge control unit 70, a MAF follow-up control unit 80, an injection amount learning correction unit 90, and a MAF correction coefficient calculating unit 95 as partial functional elements. In description, such functional elements are included in the ECU 50 which is an integral hardware. However, any part thereof may be provided in a separate hardware.

<Filter-Forced Regeneration Control>

Figure 2:
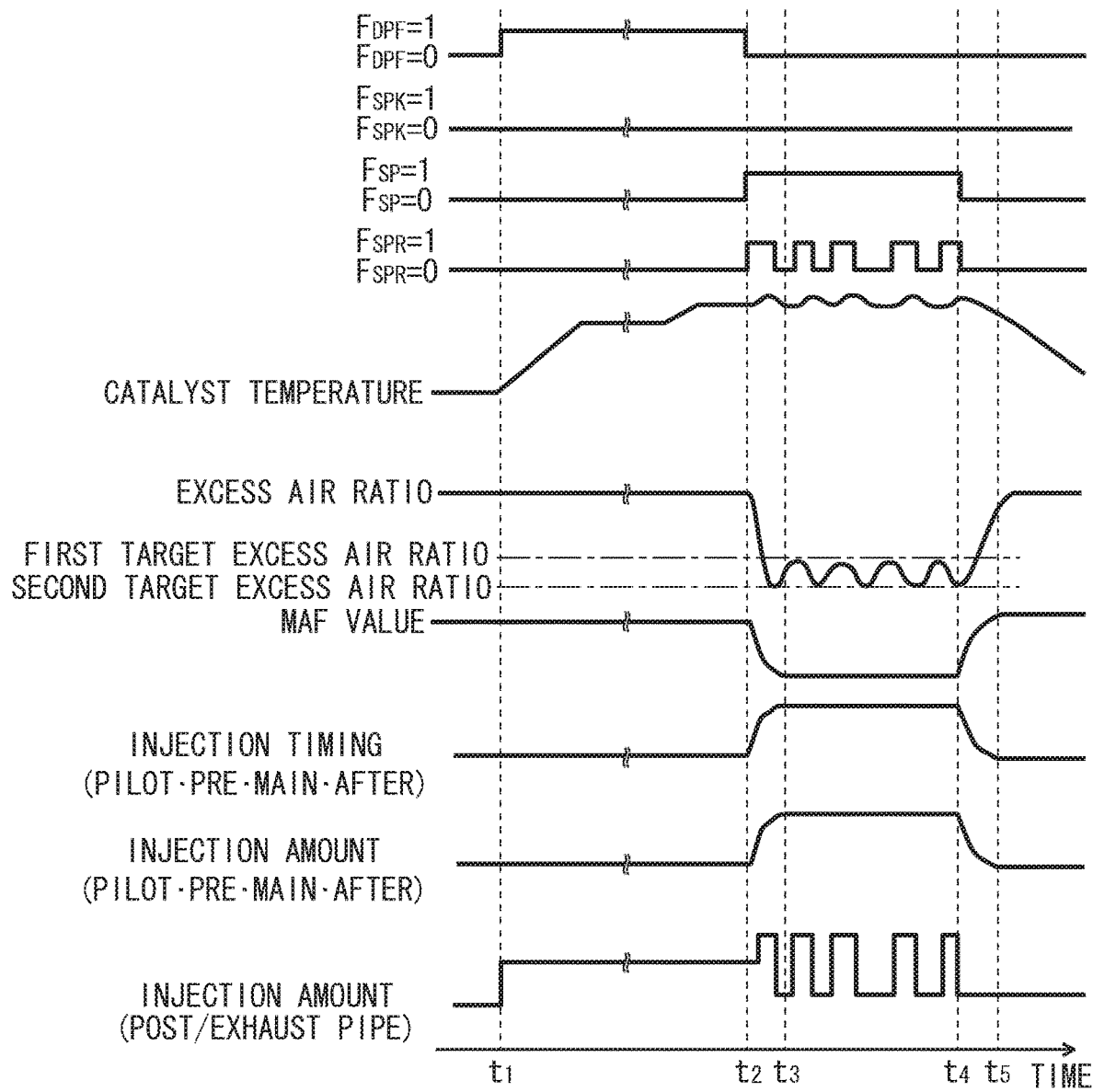
FIG. 2 is a timing chart for describing an SOx purge control according to the embodiment.

The filter regeneration control unit 51 estimates the PM deposition amount of the filter 33 from the travel distance of the vehicle, or the differential pressure across the filter detected by a differential pressure sensor (not illustrated), and turns on a forced regeneration flag $F_{DPF}$ when the estimation amount of PM deposition exceeds a predetermined upper limit threshold (see time $t_1$ of FIG. 2). When the forced regeneration flag $F_{DPF}$ is turned on, the instruction signal which executes the exhaust pipe injection is transmitted to the exhaust pipe injection device 34, or the instruction signal which executes the post injection is transmitted to each of the injectors 11, so that the exhaust temperature is raised to the PM combusting temperature (for example, about 550° C.). The forced regeneration flag $F_{DPF}$ is turned off when the estimation amount of PM deposition is reduced to a predetermined lower limit threshold (determination threshold) indicating combusting and removing (see time $t_2$ of FIG. 2). For example, the determination threshold in which the forced regeneration flag $F_{DPF}$ is turned off may be set based on the upper limit elapsed time or the upper limit cumulative injection amount from the start ($F_{DPF}=1$) of the filter-forced regeneration.

<SOx Purge Control>

The SOx purge control unit 60 is an example of a catalyst regeneration control unit of the present disclosure, and executes a control (hereinafter, referred to the control as an SOx purge control) which recovers the NOx occlusion reduction type catalyst 32 from SOx-poisoning by setting the exhaust gas to a rich state so as to raise the exhaust temperature to a sulfur desorption temperate f example, about 600° C.).

FIG. 2 illustrates a timing flowchart of the SOx purge control of the embodiment. The SOx purge control is started when a filter regeneration flag $F_{DPF}$ is turned off by the termination of a filter regeneration control and an SOx purge flag $F_{SP}$ is turned on in a state where a warming mode flag $F_{SPK}$ to be described below is turned off (see a time $t_2$ in FIG. 2).

In the embodiment, the exhaust gas is made rich using the SOx purge control, for example, in a such a manner that the SOx purge lean control that lowers the excess air ratio by an air-system control from a steady operating state (for example, about 1.5) to a first target excess air ratio (for example, about 1.3) on a lean side from a value equivalent to a theoretical air-fuel ratio (about 1.0), and the SOx purge rich control that lowers the excess air ratio by the injection system control from the first target excess air ratio to a second target excess air ratio on a rich side (for example, about 0.9) are used in combination. Hereinafter, a detail description will be given about the SOx purge lean control and the SOx purge rich control.

<Air-System Control of SOx Purge Lean Control>

Figure 3:
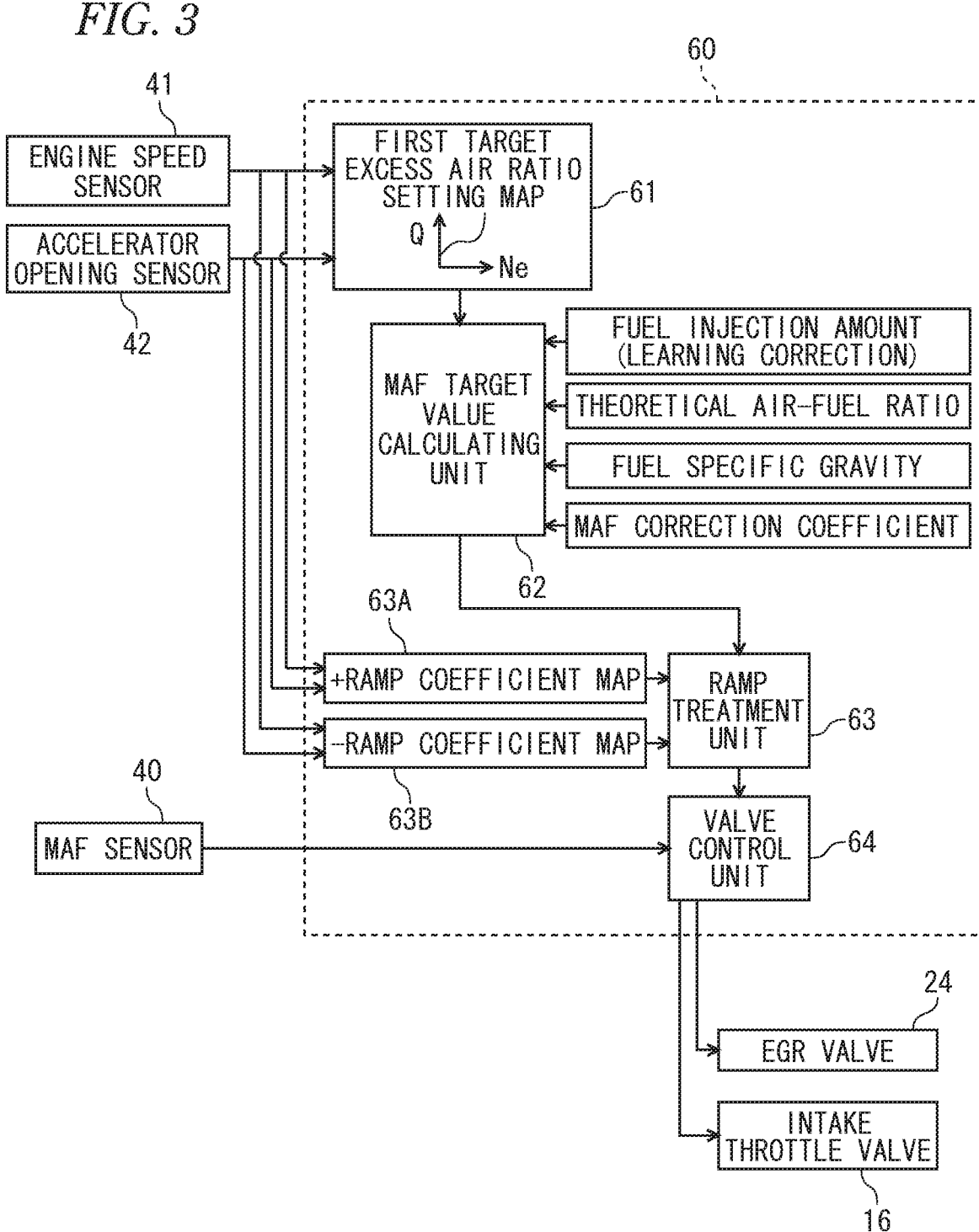
FIG. 3 is a block diagram illustrating a setting process of a MAF target value at the time of an SOx purge lean control according to the embodiment.

FIG. 3 is a block diagram illustrating a setting process of a MAF target value $MAF_{SPL\_Trgt}$ at the time of the SOx purge lean control. A first target excess air ratio setting map 61 is a map based on an engine speed Ne and an accelerator opening Q (fuel injection amount of the engine 10). An excess air ratio target value $\lambda_{SPL\_Trgt}$ (first target excess air ratio) at the time of the SOx purge lean control corresponding to the engine speed Ne and the accelerator opening Q is set based on an experiment and the like in advance.

First, the excess air ratio target value $\lambda_{NPL\_Trgt}$ at the time of the NOx purge lean control is read from the first target excess air ratio setting map 61 using the engine speed Ne and the accelerator opening Q as input signals, and is input to the MAF target value calculating unit 62. In addition, in the MAF target value calculating unit 62, the MAF target value $MAF_{NPL\_Trgt}$ at time of the NOx purge lean control is calculated based on the following Equation (1).

$$MAF_{SPL\_Trgt} = \lambda_{SPL\_Trgt} \times Q_{fnl\_corrd} \times Ro_{Fuel} \times AFR_{sto} / Maf_{\_corr} \quad (1)$$

In Equation (1), $Q_{fnl\_corrd}$ indicates a learning-corrected (to be described later) fuel injection amount (excluding the post injection), $Ro_{Fuel}$ indicates a fuel specific gravity, $AFR_{sto}$ indicates a theoretical air-fuel ratio, and $Maf_{\_corr}$ indicates a MAF correction coefficient (to be described later).

The MAF target value $MAF_{SPL\_Trgt}$ calculated by the MAF target value calculating unit 62 is input to a ramp treatment unit 63 when the SOx purge flag $F_{SP}$ is turned on (see time $t_2$ of FIG. 2). The ramp treatment unit 63 reads a ramp coefficient from a plus ramp coefficient map 63A to a minus ramp coefficient map 63B using the engine speed Ne and the accelerator opening Q as input signals, and inputs a MAF target ramp value $MAF_{SPL\_Trgt\_Ramp}$, in which the ramp coefficient is added, to a valve control unit 64.

The valve control unit 64 executes a feedback control that throttles the intake throttle valve 16 to the shutting side and opens the EGR valve 24 to the open side such that an actual MAF value $MAF_{Act}$ input from the MAF sensor 40 becomes the MAF target ramp value $MAF_{SPL\_Trgt\_Ramp}$.

In this manner, in the embodiment, the MAF target value $MAF_{SPL\_Trgt}$ is set based on the excess air ratio target value $\lambda_{SPL\_Trgt}$ read from the first target excess air ratio setting map 61 and the fuel injection amount of the injector 11, and an air system operation is feedback-controlled based on the MAF target value $MAF_{SPL\_Trgt}$. Accordingly, without providing the lambda sensor on the upstream side of the NOx occlusion reduction type catalyst 32, or without using a sensor value of the lambda sensor although the lambda sensor is provided on the upstream side of the NOx occlusion reduction type catalyst 32, the exhaust gas can be effectively lowered to the desired excess air ratio required for the SOx purge lean control.

When the fuel injection amount $Q_{fnl\_corrd}$ after the learning correction is used as the fuel injection amount of the injector 11, the MAF target value $MAF_{SPL\_Trgt}$ can be set by a feed-forward control to effectively exclude influence such as the aged deterioration, the property change, or the individual difference of the injector 11.

When the ramp coefficient set in response to the operating state of the engine 10 is added to the MAF target value $MAF_{SPL\_Trgt}$, the deterioration of the drivability and the like caused by the misfire or the torque fluctuation of the engine 10 due to the rapid change of an intake air amount can be effectively prevented.

<Fuel Injection Amount Setting of SOx Purge Rich Control>

Figure 4:
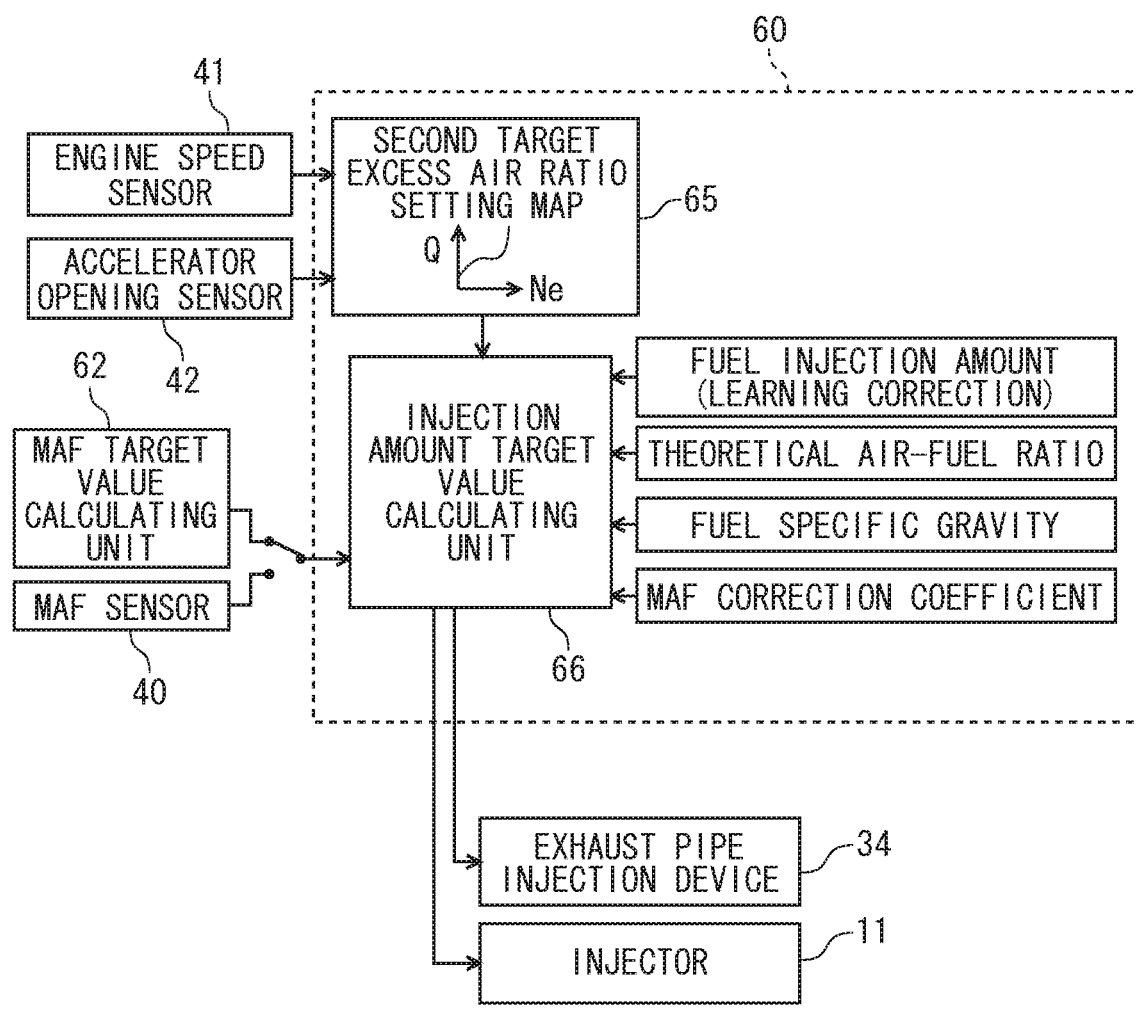
FIG. 4 is a block diagram illustrating a setting process of a target injection amount at the time of an SOx purge rich control according to the embodiment

FIG. 4 is a block diagram illustrating a setting process of the target injection amount $Q_{SPR\_Trgt}$ (injection amount per unit of time) of the exhaust pipe injection or the post injection in the SOx purge rich control. A second target excess air ratio setting map 65 is a map based on the engine speed Ne and the accelerator opening Q. The excess air ratio target value $\lambda_{SPR\_Trgt}$ (second target excess air ratio) at the time of the SOx purge rich control corresponding to the engine speed Ne and the accelerator opening Q is set based on an experiment and the like in advance.

First, the excess air ratio target value $\lambda_{SPR\_Trgt}$ at the time of the SOx purge rich control is read from the second target excess air ratio setting map 65 using the engine speed Ne and the accelerator opening Q as input signals, and is input to an injection amount target value calculating unit 66. In addition, in the injection amount target value calculating unit 66, the target injection amount $Q_{SPR\_Trgt}$ at the time of the SOx purge rich control is calculated based on the following Equation (2).

$$Q_{SPR\_Trgt} = MAF_{SPL\_Trgt} \times Maf_{\_corr} / (\lambda_{SPR\_Target} \times Ro_{Fuel} \times AFR_{sto}) - Q_{fnl\_corrd} \quad (2)$$

In Equation (2), $MAF_{SPL\_Trgt}$ is a MAF target value at the time of a lean SOx purge, and is input from the above-described MAF target value calculating unit 62. $Q_{fnl\_corrd}$ indicates a learning-corrected (to be described later) fuel injection amount (excluding the post injection) before a MAF follow-up control is applied thereto, $Ro_{Fuel}$ indicates a fuel specific gravity, and $AFR_{sto}$ indicates a theoretical air-fuel ratio, and $Maf_{\_corr}$ indicates a MAF correction coefficient (to be described later).

When the SOx purge rich flag $F_{SPR}$ (to be described later) is turned on, the target injection amount $Q_{SPR\_Trgt}$ calculated by the injection amount target value calculating unit 66 is transmitted as the injection instruction signal to the exhaust pipe injection device 34 or the injector 11.

In this manner, in the embodiment, the target injection amount $Q_{SPR\_Trgt}$ is set based on the excess air ratio target value $\lambda_{SPR\_Trgt}$ read from the second target excess air ratio setting map 65 and the fuel injection amount of the injector 11. Accordingly, without providing the lambda sensor on the upstream side of the NOx occlusion reduction type catalyst 32, or without using a sensor value of the lambda sensor although the lambda sensor is provided on the upstream side of the NOx occlusion reduction type catalyst 32, the exhaust gas can be effectively lowered to the desired excess air ratio required for the SOx purge rich control.

When the fuel injection amount $Q_{fnl\_corrd}$ after the learning correction is used as the fuel injection amount of the injector 11, the target injection amount $Q_{SPR\_Trgt}$ can be set by the feed-forward control to effectively exclude influence such as the aged deterioration, the property change, or the like of the injector 11.

Meanwhile, when a predetermined prohibition condition to be described below is satisfied during the execution of the SOx purge control, a warming mode control is performed to maintain the exhaust temperature at a filter regeneration control temperature lower than the target temperature of the SOx purge control. Since an air system is open-loop controlled in the warming mode control, the air system switches from the open loop control to the feedback control when returning to the SOx purge control from the warming mode control, and an actual MAF value does not follow a MAF target value $MAF_{SPL\_Trgt}$ for a predetermined period. As a result, even if the SOx purge rich control for setting the target injection amount $Q_{SPR\_Trgt}$ is performed based on Equation (2) described above using the MAF target value $MAF_{SPL\_Trgt}$, there is a possibility that the exhaust can be effectively lowered to the target excess air ratio $\lambda_{SPR\_Trgt}$, which is a target value, and the time required for the SOx purge control is prolonged.

Therefore, the embodiment is configured such that the target injection amount $Q_{SPR\_Trgt}$ is set based on the following Equation (3), in which the MAF target $MAF_{SPL\_Trgt}$ of Equation (2) described above is switched an actual MAF value $MAF_{\_Act}$ detected by the MAF sensor 40, when returning from the warming mode control to the SOx purge control.

$$Q_{SPR\_Trgt} = MAF_{\_ACT} \times Maf_{\_corr}/(\lambda_{SPR\_Trgt} \times Ro_{Fuel} \times AFR_{sto}) - Q_{fnl\_corrd} \quad (3)$$

The logic for switching the MAF target value $MAF_{SPL\_Trgt}$ to the actual MAF value MAF_Act is not limited to the case where the air system returns to the SOx purge control from the warming mode control, and may be configured to perform the SOx purge rich control using only Equation (3) at the time of the start of the SOx purge control from the filter regeneration control, that is, over the period from the start to the end of the SOx purge control. Further, the logic may be configured to be applied only for the predetermined period from the start or restart of the SOx purge control until the air flow is stabilized.

<Catalyst Temperature Adjustment Control of SOx Purge Control>

As illustrated in times $t_2$ to $t_4$ of FIG. 2, the temperature of the exhaust gas (hereinafter, referred to as a catalyst temperature) flowing in the NOx occlusion reduction type catalyst 32 during the SOx purge control is controlled by alternately switching on and off (rich and lean) of the SOx purge rich flag $F_{SPR}$ which executes the exhaust pipe injection or the post injection. When the SOx purge rich flag $F_{SPR}$ is turned on ($F_{SPR}$=1), the catalyst temperature is raised by the exhaust pipe injection or the post injection (hereinafter, referred to a time thereof as an injection time $T_{F\_INJ}$). On the other hand, when the SOx purge rich flag $F_{SPR}$ is turned off, the catalyst temperature is lowered by the stop of the exhaust pipe injection or the post injection (hereinafter, referred to a time thereof as an interval $T_{F\_INT}$).

In the embodiment, the injection time $T_{F\_INJ}$ is set by reading a value corresponding to the engine speed. Ne and the accelerator opening Q from an injection time setting map (not illustrated) created through an experiment and the like in advance. In the injection time setting map, the injection time required to reliably lower the excess air ratio of the exhaust gas obtained by an experiment and the like in advance to the second target excess air ratio is set in response to the operating state of the engine 10.

When the SOx purge rich flag $F_{SPR}$ in which the catalyst temperature is the highest is switched from the On state to the Off state, the interval $T_{F\_INT}$ is set through a feedback control. Specifically, the interval $T_{F\_INT}$ is processed by a PID control configured by a proportional control that changes an input signal in proportion to the deviation $\Delta T$ between a target catalyst temperature and an estimated catalyst temperature when the SOx purge rich flag $F_{SPR}$ is turned off, an integral control that changes the input signal in proportion to a time integral value of the deviation $\Delta T$, and a differential control that changes the input signal in proportion to a time differential value of the deviation $\Delta T$. The target catalyst temperature is set to such a degree as to desorb SOx from the NOx occlusion reduction type catalyst 32. The estimated catalyst temperature may be estimated, for example, based on an inlet temperature of the oxidation catalyst 31 detected by the first exhaust temperature sensor 43, an exothermic reaction inside the oxidation catalyst 31 and the NOx occlusion reduction type catalyst 32, and the like.

Figure 5:
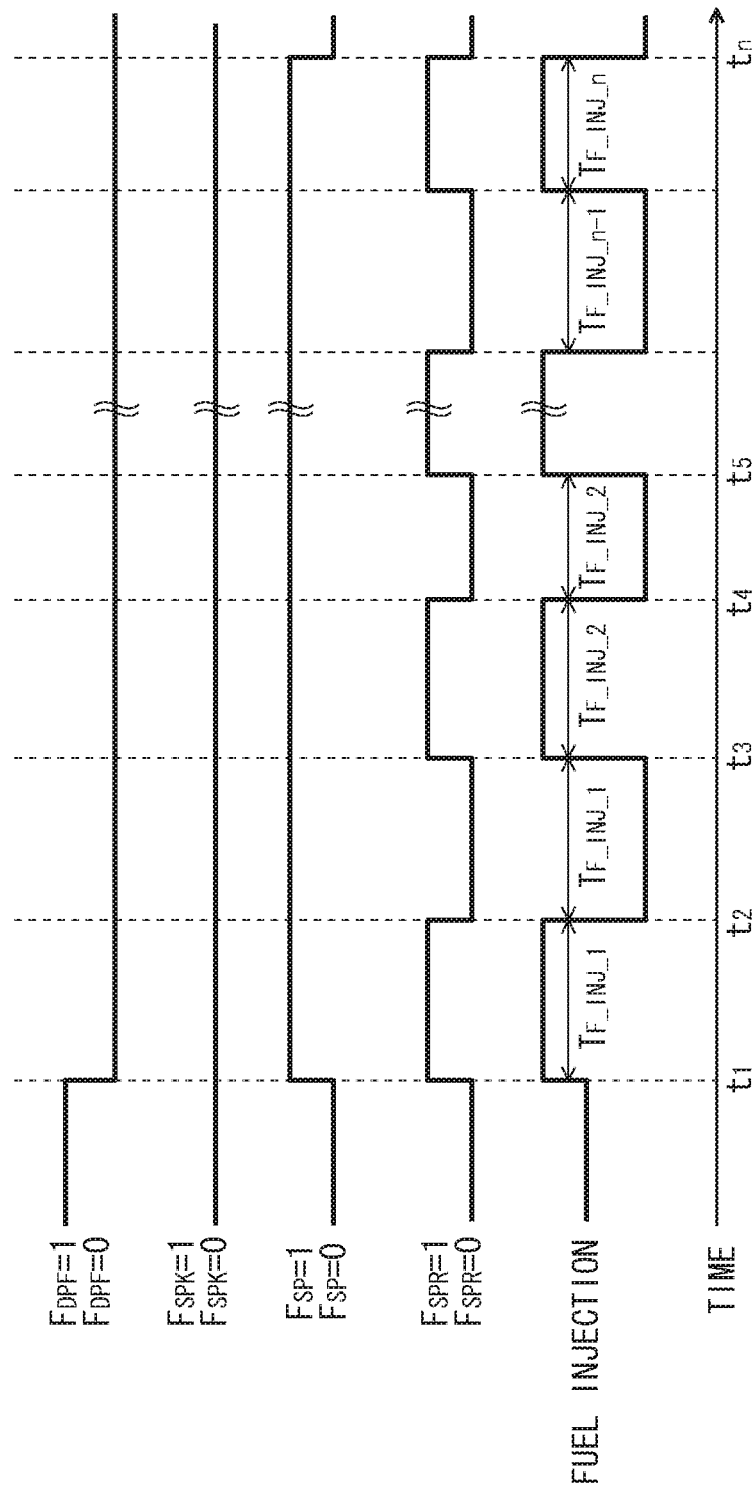
FIG. 5 is a timing chart for describing a catalyst temperature adjustment control in the SOx purge control according to the embodiment.

As illustrated in time $t_1$ of FIG. 5, when the SOx purge flag $F_{SP}$ is turned on by the turning-off of the filter regeneration flag $F_{DPF}$ and the warming mode flag $F_{SPK}$, the SOx purge flag $F_{SP}$ is also turned on, and the interval $T_{F\_INT}$ feedback-calculated at the time of the previous SOx purge control is reset temporarily. That is, at first time just after the filter-forced regeneration, the exhaust pipe injection or the post injection is executed in response to the injection time $T_{F\_INJ\_1}$ set in the injection time setting map (see time from $t_1$ to $t_2$ of FIG. 5). In this manner, the SOx purge control starts from the SOx purge rich control without performing the SOx purge lean control, and thus a prompt transition to the SOx purge control can be performed and the fuel consumption amount can be reduced without lowering the exhaust temperature raised by the filter-forced regeneration.

Next, when the SOx purge rich flag $F_{SPR}$ is turned off with the lapse of the injection time $T_{F\_INJ\_1}$, the SOx purge rich flag $F_{SPR}$ is turned off until the interval $T_{F\_INT\_1}$ set by the PID control elapses (see times $t_2$ to $t_3$ of FIG. 5). In addition, when the SOx purge rich flag $F_{SPR}$ is turned on with the lapse of the interval $T_{F\_INT\_1}$, the exhaust pipe injection or the post injection according to the injection time $T_{F\_INJ\_2}$ is executed again (see time from $t_3$ to $t_4$ of FIG. 5). Thereafter, the on-and-off switching of the SOx purge rich flag $F_{SPR}$ is repeatedly executed until the SOx purge flag $F_{SP}$ is turned off (see time $t_n$ of FIG. 5) by the termination determination of the SOx purge control (to be described later).

In this manner, in the embodiment, the injection time $T_{F\_INJ}$ in which the catalyst temperature is raised and the excess air ratio is lowered to the second target excess air ratio is set from the map based on the operating state of the engine 10, and the interval $T_{F\_INT}$ in which the catalyst temperature is lowered is treated by the PID control. Accordingly, the catalyst temperature in the SOx purge control is effectively kept in the desired temperature range required for a purge, and the excess air ratio can be reliably lowered to a target excess ratio.

<Prohibition Determination of SOx Purge Control>

When the SOx purge control is executed in a state where the engine speed Ne is very high or the fuel injection amount of the injector 11 is very large, there is a possibility that the engine temperature suddenly rises. Further, when unburned fuel is supplied in a state where the temperature of the NOx occlusion reduction type catalyst 32 is lowered, there is also a problem that occurrence of white smoke and the like is caused by a phenomenon in which hydrocarbon (HC) passes through the catalyst and is discharged, that is, an increase in so-called HC slip.

To prevent such a phenomenon, the SOx purge prohibition processing unit 53 (see FIG. 1) determines to be an "out of the SOx purge allowable range" and prohibits execution of the SOx purge control when any one of the following prohibition conditions is satisfied: (1) a case where the engine speed Ne exceeds a predetermined upper-limit threshold speed indicating, for example, rotation abnormality, (2) a case where the fuel injection amount of the injector 11 exceeds a predetermined upper-limit threshold injection amount indicating, for example, injection abnormality, or (3) a case where the catalyst temperature of the NOx occlusion reduction type catalyst 32 is lowered to a predetermined threshold temperature (for example, about 500° C.) lower than a target temperature (PM combusting temperature) of the filter regeneration control. More specifically, when any one of these prohibition conditions (1) to (3) is established at the beginning or during execution of the SOx purge control and it is determined to be "out of the SOx purge allowable range", a warming mode control to be described below is executed. On the other hand, when none of these prohibition conditions (1) to (3) is established, it is determined to be within "the SOx purge allowable range", and the execution of the SOx purge control is permitted.

The prohibition conditions are not limited to these three conditions, and another prohibition condition such as system malfunction unsuitable for implementation of the SOx purge can also be added.

<Warming Mode Control>

The warming mode control unit 54 (see FIG. 1) is an example of a catalyst warming control unit of the present disclosure, and turns on a warming mode flag $F_{SPK}$ to start the warming mode control when any one of these prohibition conditions (1) to (3) described above is established at the end of the filter regeneration control (at the beginning or during execution of the SOx purge control) or during the execution of the SOx purge control. The warming mode control is performed by feedback-controlling the exhaust pipe injection amount or the post injection amount based on a predetermined warming target temperature lower than a SOx desorption temperature and open-loop controlling the air flow of the engine 10. In the embodiment, the warming target temperature is set to a target temperature (PM combusting temperature) of the filter regeneration control, for example.

Switching processing of the filter regeneration control, the warming mode control, and the SOx purge control will be described in detail below with reference to FIG. 6.

When any one of the prohibition conditions (1) to (3) is established at the end of the filter regeneration control ($F_{DPF}=0$) and it is determined to be out of "the SOx purge allowable range", as indicated in a pattern A of FIG. 6, the operation is shifted to the warming mode control ($F_{SPK}=1$) without starting the SOx purge control.

On the other hand, when any one of the prohibition conditions (1) to (3) is not established at the end of the filter regeneration control ($F_{DPF}=0$) and it is determined to be within "the SOx purge allowable range", as indicated in a pattern B of FIG. 6, the operation is not shifted to the warming mode control the SOx purge control is started ($F_{SP}=1$).

While the prohibition conditions (1) to (3) are not established during the execution of the SOx purge control ($F_{SP}=1$) and it is determined to be within "the SOx purge allowable range", as indicated in a pattern C of FIG. 6, a catalyst temperature adjusting control (see FIG. 5) is performed to alternately switch on/off (rich/lean) of the SOx purge rich flag $F_{SPR}$.

On the other hand, when any one of the prohibition conditions (1) to (3) are established during the execution of the SOx purge control and it is determined to be out of "the SOx purge allowable range", as indicated in a pattern C of FIG. 6, the operation is shifted to the warming mode control to stop the SOx purge control ($F_{SPK}=1$).

In the embodiment, as described above, when it is determined to be out of "the SOx purge allowable range" at the start and the execution of the SOx purge control, the SOx purge control is prohibited and the warming mode control is executed. Thus, it is possible to firmly suppress useless execution of the SOx purge control and to effectively prevent the deterioration of fuel consumption, the sudden increase in engine temperature, the occurrence of white smoke, and the like, in addition, since the catalyst temperature is maintained at the PM combusting temperature by the warming mode control during the prohibition (suspension) of the SOx purge control, the fuel consumption amount can be effectively reduced at the re-start of the SOx purge control.

<Termination Determination of SOx Purge Control>

When any condition of (1) a case where the injection amount of the exhaust pipe injection or the post injection is accumulated since the SOx purge flag $F_{SP}$ is turned on, and the cumulative injection amount reaches a predetermined upper limit threshold amount, (2) a case where the elapsed time timed from the start of the SOx purge control reaches a predetermined upper limit threshold time, and (3) a case where the SOx adsorbing amount of the NOx occlusion reduction type catalyst 32 calculated based on a predetermined model equation including an operating state of the engine 10, a sensor value of the NOx/lambda sensor 45, or the like as input signals is reduced to a predetermined threshold indicating SOx removal success is satisfied, the SOx purge control is terminated by turning off the SOx purge flag $F_{SP}$ (see time $t_4$ of FIG. 2 and time $t_n$ of FIG. 5).

In this manner, in the embodiment, the upper limit of the cumulative injection amount and the elapsed time is set in the termination condition of the SOx purge control so that it can be effectively prevented that the fuel consumption amount is excessive in a case where the SOx purge does not progress due to the lowering of the exhaust temperature and the like.

<NOx Purge Control>

The NOx purge control unit 70 is an example of the catalyst regeneration control unit of the present disclosure, and executes a control (hereinafter, referred to as an NOx purge control) that recovers the NOx occlusion capacity of the NOx occlusion reduction type catalyst 32 by detoxifying the NOx, which is occluded in the NOx occlusion reduction type catalyst 32 when the exhaust gas is under a rich atmosphere, by reduction purification, and then discharging the NOx.

Figure 7:
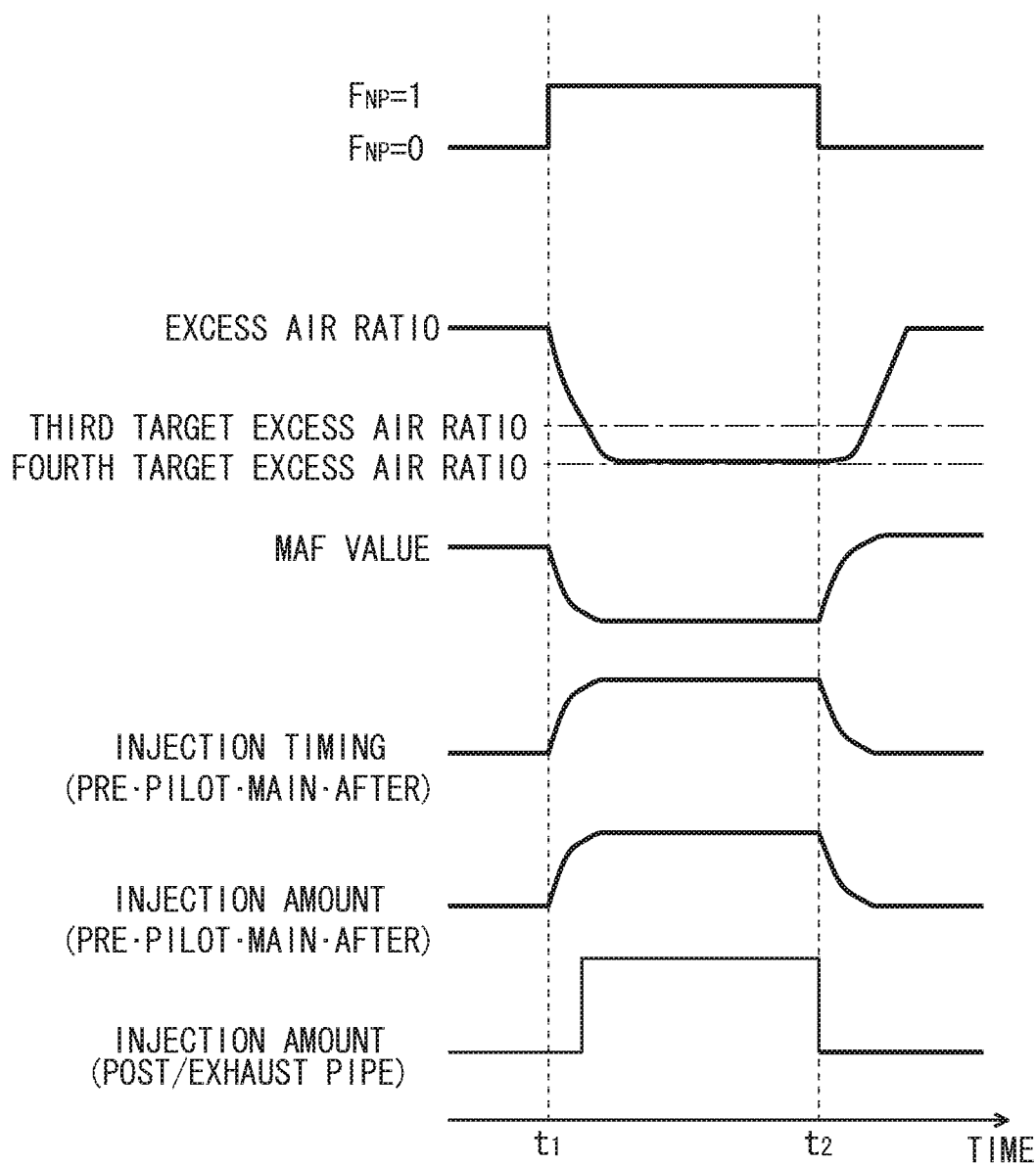
FIG. 7 is a timing chart for describing an NOx purge control according to the embodiment.

The NOx purge flag $F_{NP}$ which starts the NOx purge control is turned on when an NOx discharging amount per unit of time is estimated from the operating state of the engine 10, and an estimated accumulated value $\Sigma$NOx calculated by accumulating the NOx discharging amounts exceeds the predetermined threshold (see time $t_1$ of FIG. 7). Alternatively, the NOx purge flag $F_{NP}$ is turned on in a case where an NOx purification rate of the NOx occlusion reduction type catalyst 32 is calculated from the NOx discharging amount on the catalyst upstream side estimated from the operating state of the engine 10, and an NOx amount on the catalyst downstream side detected by the NOx/lambda sensor 45, and the NOx purification rate is lower than the predetermined determination threshold.

In the embodiment, the exhaust gas is made rich using the NOx purge control, for example, in such a manner that the NOx purge lean control that lowers the excess air ratio by an air-system control from a steady operating state (for example, about 1.5) to a third target excess air ratio (for example, about 1.3) on a lean side from a value equivalent to a theoretical air-fuel ratio (about 1.0), and the NOx purge rich control that lowers the excess air ratio by the injection system control from the third target excess air ratio to the fourth target excess air ratio on a rich side (for example, about 0.9) are used in combination. Hereinafter, the detail description will be given about the NOx purge lean control and the NOx purge rich control.

<MAF Target Value Setting of NOx Purge Lean Control>

Figure 8:
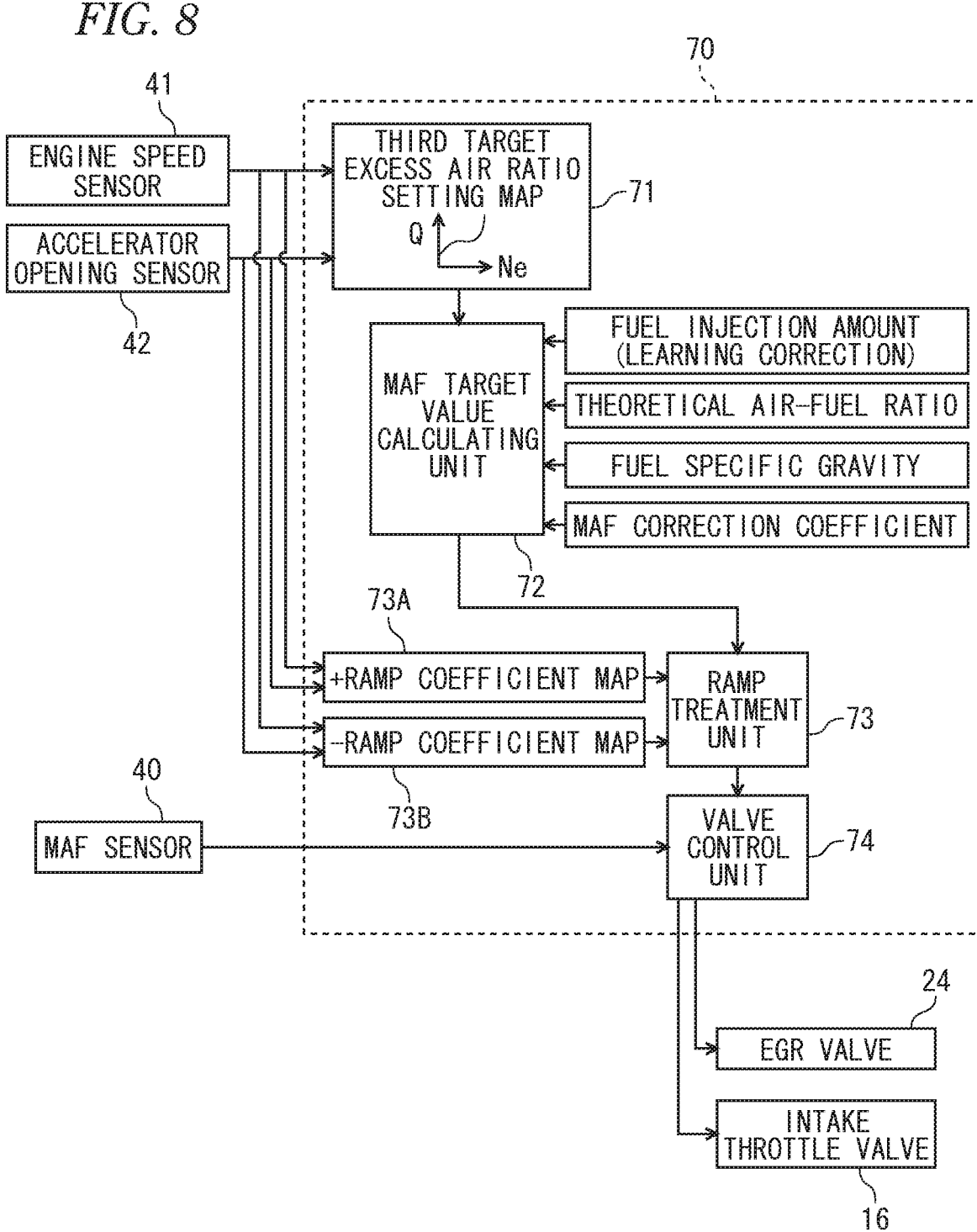
FIG. 8 is a block diagram illustrating a setting process of a MAF target value at the time of an NOx purge lean control according to the embodiment.

FIG. 8 is a block diagram illustrating a setting process of the MAF target value $MAF_{NPL\_Trgt}$ at the time of the NOx purge lean control. The third target excess air ratio setting map 71 is a map based on the engine speed Ne and the accelerator opening Q. The excess air ratio target value $\lambda_{NPL\_Trgt}$ (third target excess air ratio) at the time of the NOx purge lean control corresponding to the engine speed Ne and the accelerator opening Q is set based on an experiment and the like in advance.

First, the excess air ratio target value $\lambda_{NPL\_Trgt}$ at the time of the NOx purge lean control is read from the third target excess air ratio setting map 71 using the engine speed Ne and the accelerator opening Q as input signals, and is input to the MAF target value calculating unit 72. In addition, in the MAF target value calculating unit 72, the MAF target value $MAF_{NPL\_Trgt}$ at time of the NOx purge lean control is calculated based on the following Equation (4).

$$MAF_{NPL\_Trgt} = \lambda_{NPL\_Trgt} \times Q_{fnl\_corrd} \times Ro_{Fuel} \times AFR_{sto} / Maf_{corr} \quad (4)$$

In Equation (4), $Q_{fnl\_corrd}$ indicates a learning-corrected (to be described later) fuel injection amount (excluding the post injection), $Ro_{Fuel}$ indicates a fuel specific gravity, $AFR_{sto}$ indicates a theoretical air-fuel ratio, and $Maf_{corr}$ indicates a MAF correction coefficient (to be described later).

The MAF target value $MAF_{NPL\_Trgt}$ calculated by the MAF target value calculating unit 72 is input to a ramp treatment unit 73 when the NOx purge flag $F_{NP}$ is turned on (see time $t_1$ of FIG. 7). The ramp treatment unit 73 reads a ramp coefficient from a plus ramp coefficient map 73A and a minus ramp coefficient map 73B using the engine speed Ne and the accelerator opening Q as input signals, and inputs a MAF target ramp value $MAF_{NPL\_Trgt\_Ramp}$, in which the ramp coefficient is added, to a valve control unit 74.

The valve control unit 74 is an example of the air-system control unit of the present disclosure, and executes a feedback control that throttles the intake throttle valve 16 to the shutting side and opens the EGR valve 24 to the open side such that the actual MAF value $MAF_{Act}$ input from the MAF sensor 40 becomes the MAF target ramp value $MAF_{NPL\_Trgt\_Ramp}$.

In this manner, in the embodiment, the MAF target value $MAF_{NPL\_Trgt}$ is set based on the excess air ratio target value $\lambda_{NPL\_Trgt}$ read from the third target excess air ratio setting map 71 and the fuel injection amount of the injector 11, and an air system operation is feedback-controlled based on the MAF target value $MAF_{NPL\_Trgt}$. Accordingly, without providing the lambda sensor on the upstream side of the NOx occlusion reduction type catalyst 32, or without using a sensor value of the lambda sensor although the lambda sensor is provided on the upstream side of the NOx occlusion reduction type catalyst 32, the exhaust gas can be effectively lowered to the desired excess air ratio required for the NOx purge lean control.

When the fuel injection amount $Q_{fnl\_corrd}$ after the learning correction is used as the fuel injection amount of the injector 11, the MAF target value $MAF_{NPL\_Trgt}$ can be set by a feed-forward control to effectively exclude influence such as the aged deterioration, the property change, or the like of the injector 11.

When the ramp coefficient set in response to the operating state of the engine 10 is added to the MAF target value $MAF_{NPL\_Trgt}$, the deterioration of the drivability and the like caused by the misfire or the torque fluctuation of the engine 10 due to the rapid change of the intake air amount can be effectively prevented.

<Fuel Injection Amount Setting of NOx Purge Rich Control>

Figure 9:
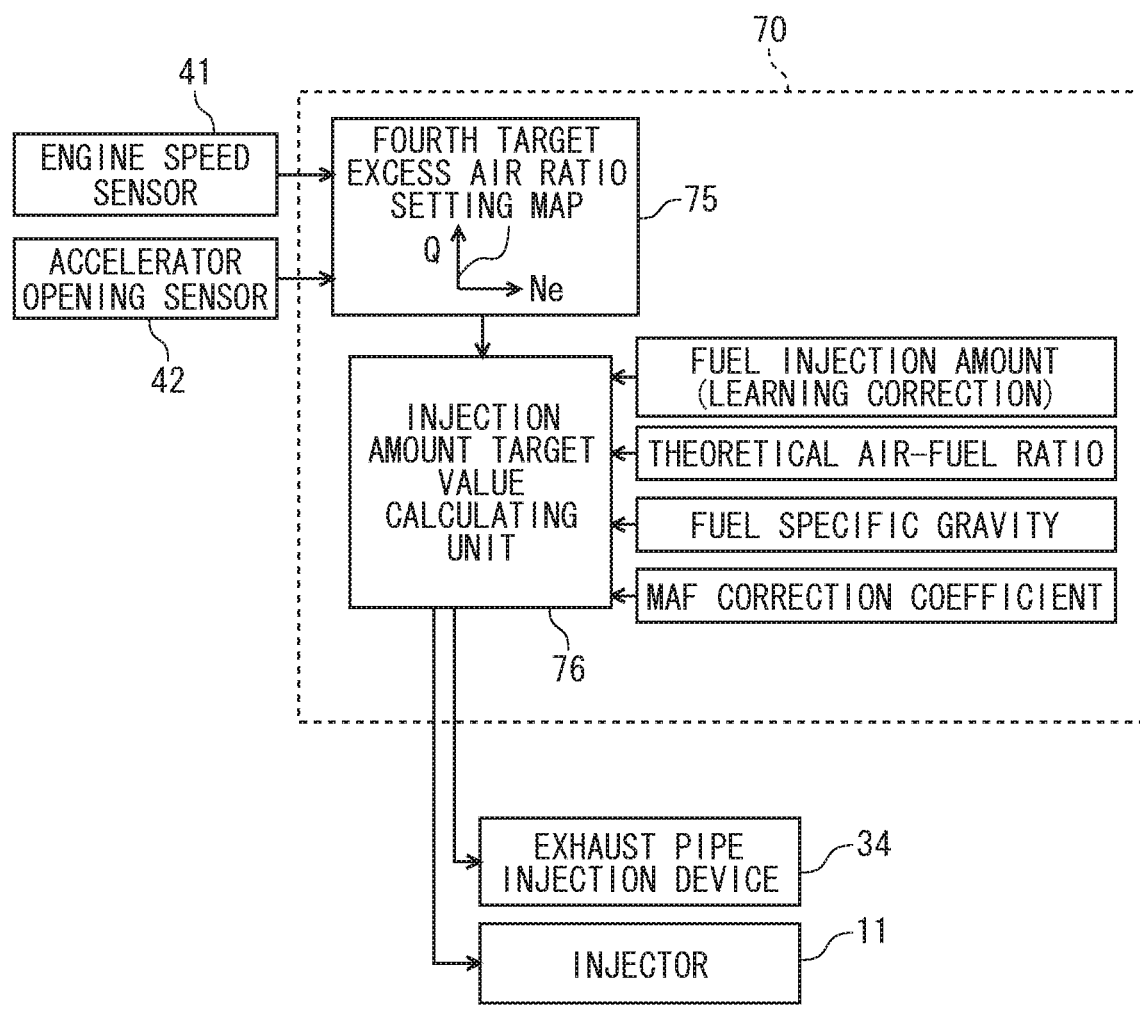
FIG. 9 is a block diagram illustrating a setting process of a target injection amount at the time of an NOx purge rich control according to the embodiment.

FIG. 9 is a block diagram illustrating a setting process of the target injection amount $Q_{NPR\_Trgt}$ (injection amount per unit of time) of the exhaust pipe injection or the post injection in the NOx purge rich control. A fourth target excess air ratio setting map 75 is a map based on the engine speed Ne and the accelerator opening Q. The excess air ratio target value $\lambda_{NPR\_Trgt}$ (fourth target excess air ratio) at the time of the NOx purge rich control corresponding to the engine speed Ne and the accelerator opening Q is set based on an experiment and the like in advance.

First, the excess air ratio target value $\lambda_{NPR\_Trgt}$ at the time of the NOx purge rich control is read from the fourth target excess air ratio setting map 75 using the engine speed Ne and the accelerator opening Q as input signals, and is input to an injection amount target value calculating unit 76. In addition, in the injection amount target value calculating unit 76, the target injection amount $Q_{NPR\_Trgt}$ at the time of the NOx purge rich control is calculated based on the following Equation (5).

$$Q_{NPR\_Trgt} = MAF_{NPL\_Trgt} \times Maf_{corr} / (\lambda_{NPR\_Trgt} \times Ro_{Fuel} \times AFR_{sto}) - Q_{fnl\_corrd} \quad (5)$$

In Equation (5), $MAF_{NPL\_Trgt}$ is a MAF target value at the time of a lean NOx purge, and is input from the above-described MAF target value calculating unit 72. $Q_{fnl\_corrd}$ indicates a learning-corrected (to be described later) fuel injection amount (excluding the post injection) before a MAF follow-up control is applied thereto, $Ro_{Fuel}$ indicates a fuel specific gravity, and $AFR_{sto}$ indicates a theoretical air-fuel ratio, and $Maf_{corr}$ indicates a MAF correction coefficient (to be described later).

When the NOx purge flag $F_{NP}$ is turned on, the target injection amount $Q_{NPR\_Trgt}$ calculated by the injection amount target value calculating unit 76 is transmitted as the injection instruction signal to the exhaust pipe injection device 34 or the injector 11 (time $t_1$ of FIG. 7). The transmission of the injection instruction signal is continued until the NOx purge flag $F_{NP}$ is turned off (time $t_2$ of FIG. 7) by the termination determination of the NOx purge control (to be described later).

In this manner, in the embodiment, the target injection amount $Q_{NPR\_Trgt}$ is set based on the excess air ratio target value $\lambda_{NPR\_Trgt}$ read from the fourth target excess air ratio setting map 75 and the fuel injection amount of the injector 11. Accordingly, without providing the lambda sensor on the upstream side of the NOx occlusion reduction type catalyst 32, or without using a sensor value of the lambda sensor although the lambda sensor is provided on the upstream side of the NOx occlusion reduction type catalyst 32, the exhaust gas can be effectively lowered to the desired excess air ratio required for the NOx purge rich control.

When the fuel injection amount $Q_{fnl\_corrd}$ after the learning correction is used as the fuel injection amount of the injector 11, the target injection amount $Q_{NPR\_Trgt}$ can be set by the feed-forward control to effectively exclude influence such as the aged deterioration, the property change, or the like of the injector 11.

<Termination Determination of NOx Purge Control>

When any condition of (1) a case where the injection amount of the exhaust pipe injection or the post injection is accumulated since the NOx purge flag $F_{NP}$ is turned on, and the cumulative injection amount reaches a predetermined upper limit threshold amount, (2) a case where the elapsed time timed from the start of the NOx purge control reaches the predetermined upper limit threshold time, and (3) a case where the NOx occlusion amount of the NOx occlusion reduction type catalyst 32 calculated based on a predetermined model equation including an operating state of the engine 10, a sensor value of the NOx/lambda sensor 45, or the like as input signals is reduced to a predetermined threshold indicating NOx removal success is satisfied, the NOx purge control is terminated by turning off the NOx purge flag $F_{NP}$ (see time $t_2$ of FIG. 7).

In this manner, in the embodiment, the upper limit of the cumulative injection amount and the elapsed time is set in the termination condition of the NOx purge control so that it can be reliably prevented that the fuel consumption amount is excessive in a case where the NOx purge does not succeed due to the lowering of the exhaust temperature and the like.

<MAF Follow-Up Control>

In (1) a time of switching from the lean state of a regular operation to the rich state through the SOx purge control or the NOx purge control, and (2) a time of switching the rich state to the lean state of the regular operation through the SOx purge control or the NOx purge control, the MAF follow-up control unit 80 executes a control to correct the fuel injection timing and the fuel injection amount of each in-cylinder injector 11 in response to a MAF change (MAF follow-up control).

<Injection Amount Learning Correction>

Figure 10:
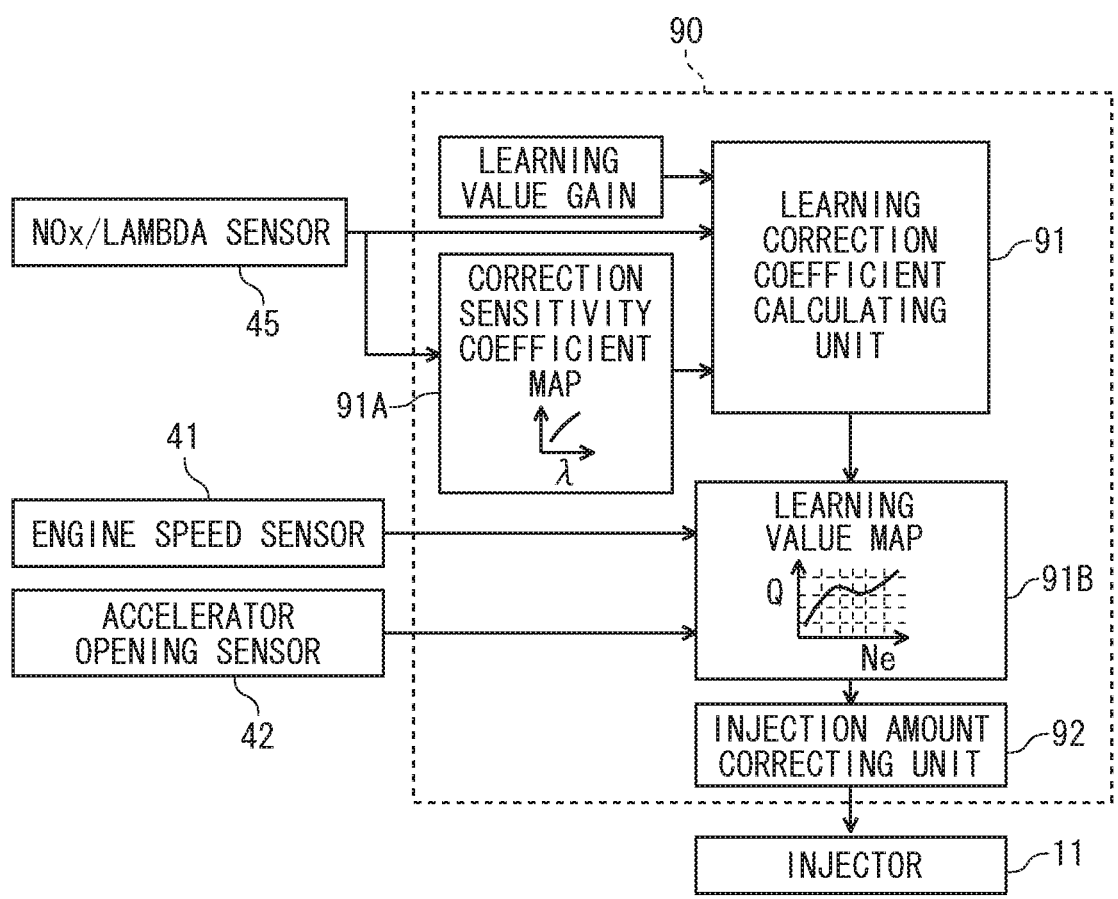
FIG. 10 is a block diagram illustrating a process of an injection amount learning correction of an injector according to the embodiment.

As illustrated in FIG. 10, the injection amount learning correction unit 90 includes a learning correction coefficient calculating unit 91 and an injection amount correcting unit 92.

Figure 11:
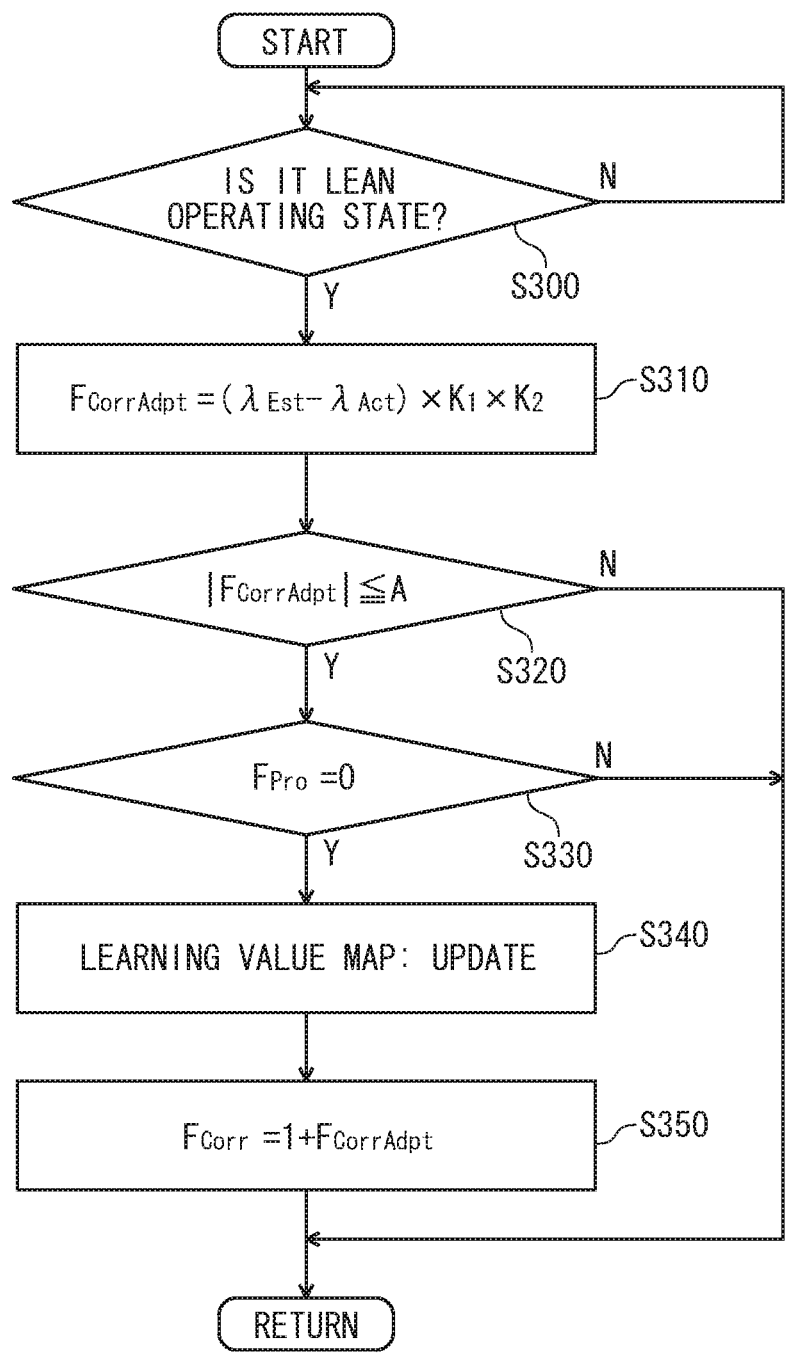
FIG. 11 is a flow diagram for describing a calculation process of a learning correction coefficient according to the embodiment.

The learning correction coefficient calculating unit 91 calculates a learning correction coefficient $F_{Corr}$ of the fuel injection amount based on an error $\Delta\lambda$ between an actual lambda value $\lambda_{Act}$ detected by the NOx/lambda sensor 45 at the time of a lean operation of the engine 10 and an estimated lambda value $\lambda_{Est}$. When the exhaust gas is in the lean state, the HC concentration in the exhaust gas is very low, so that the change in the exhaust lambda value due to the oxidation reaction of HC in the oxidation catalyst 31 is negligibly small. For this reason, it is considered that the actual lambda value $\lambda_{Act}$ in the exhaust gas which passes through the oxidation catalyst 31 and is detected by the NOx/lambda sensor 45 on the downstream side matches with the estimated lambda value $\lambda_{Est}$ in the exhaust gas discharged from the engine 10. For this reason, in a case where the error $\Delta\lambda$ occurs between the actual lambda value $\lambda_{Act}$ and the estimated lambda value $\lambda_{Est}$, the error can be assumed to result from a difference between an instructed injection amount and an actual injection amount in the injector 11. Hereinafter, the calculation process of the learning correction coefficient performed by the learning correction coefficient calculating unit 91 using the error $\Delta\lambda$ will be described based on the flow of FIG. 11.

In Step S300, it is determined based on the engine speed Ne and the accelerator opening Q whether the engine 10 is in a lean operating state. If the engine 10 is in the lean operating state, the procedure proceeds to Step S310 in order to start the calculation of the learning correction coefficient.

In Step S310, a learning value $F_{CorrAdpt}$ is calculated by multiplying the error $\Delta\lambda$ obtained by subtracting the actual lambda value $\lambda_{Act}$ detected by the NOx/lambda sensor 45 from the estimated lambda value $\lambda_{Est}$ by a learning value gain $K_1$ and a correction sensitivity coefficient $K_2$ ($F_{CorrAdpt}=(\lambda_{Est}-\lambda_{Act})\times K_1 \times K_2$). The estimated lambda value $\lambda_{Est}$ is estimated and calculated from the operating state of the engine 10 depending on the engine speed Ne or the accelerator opening Q. The correction sensitivity coefficient $K_2$ is read from a correction sensitivity coefficient map 91A illustrated in FIG. 10 using the actual lambda value $\lambda_{Act}$ detected by the NOx/lambda sensor 45 as an input signal.

In Step S320, it is determined whether an absolute value $|F_{CorrAdpt}|$ of the learning value $F_{CorrAdpt}$ is in a range of a predetermined correction limit value A. In a case where the absolute value $|F_{CorrAdpt}|$ exceeds the correction limit value A, this control returns to stop the present learning.

In Step S330, it is determined whether a learning prohibition flag $F_{Pro}$ is turned off. The learning prohibition flag $F_{Pro}$ corresponds, for example, to the time of a transient operation of the engine 10, the time of the SOx purge control ($F_{SP}=1$), the time of the NOx purge control ($F_{NP}=1$), and the like. It is because in a state where such a condition is satisfied, the error $\Delta\lambda$ becomes larger according to the change of the actual lambda value $\lambda_{Act}$ so that the learning is not executed exactly. As for whether the engine 10 is in a transient operating state, for example, based on the time change amount of the actual lambda value $\lambda_{Act}$ detected by the NOx/lambda sensor 45, a case where the time change amount is larger than the predetermined threshold may be determined as the transient operating state.

In Step S340, a learning value map 91B (see FIG. 10) based on the engine speed Ne and the accelerator opening Q is updated to the learning value $F_{CorrAdpt}$ calculated in Step S310. More specifically, a plurality of learning areas sectioned in response to the engine speed Ne and the accelerator opening Q are set on the learning value map 91B. Preferably, such learning areas are set such that the range thereof is narrower as the area is used more frequently, and the range thereof is wider as the area is used less frequently. Accordingly, in the frequently used area, a learning accuracy can be improved, and in the less-frequently used area, non-learning can be effectively prevented.

In Step S350, the learning correction coefficient $F_{Corr}$ is calculated by adding "1" to the learning value read from the learning value map 91B using the engine speed Ne and the accelerator opening Q as input signals ($F_{Corr}=1+F_{CorrAdpt}$). The learning correction coefficient $F_{Corr}$ is input to the injection amount correcting unit 92 illustrated in FIG. 10.

The injection amount correcting unit 92 executes the correction of the fuel injection amount by multiplying respective basic injection amounts of a pilot injection $Q_{Pilot}$, a pre-injection $Q_{Pre}$, a main injection $Q_{Main}$, an after injection $Q_{After}$, and a post injection $Q_{Post}$ by the learning correction coefficient $F_{Corr}$.

In this manner, a variation such as the aged deterioration, the property change, or the individual difference of the injectors 11 can be effectively excluded by correcting the fuel injection amount of the injector 11 with the learning value according to the error $\Delta\lambda$ between the estimated lambda value $\lambda_{Est}$ and the actual lambda value $\lambda_{Act}$.

<MAF Correction Coefficient>

The MAF correction coefficient calculating unit 95 calculates a. MAF correction coefficient $Maf_{\_corr}$ used to set the MAF target value $MAF_{SPL\_Trgt}$ or the target injection amount $Q_{SPR\_Trgt}$ at the time of the SOx purge control and to set the MAF target value $MAF_{NPL\_Trgt}$ or the target injection amount $Q_{NPR\_Trgt}$ at the time of the NOx purge control.

In the embodiment, the fuel injection amount of the injector 11 is corrected based on the error $\Delta\lambda$ between the actual lambda value $\lambda_{Act}$ detected by the NOx/lambda sensor 45 and the estimated lambda value $\lambda_{Est}$. However, since the lambda is a ratio of air and fuel, a factor of the error $\Delta\lambda$ is not necessarily limited to the effect of the difference between the instructed injection amount and the actual injection amount in the injector 11. That is, the error $\Delta\lambda$ of the lambda may be affected by an error of the MAF sensor 40 as well as that of the injector 11.

Figure 12:
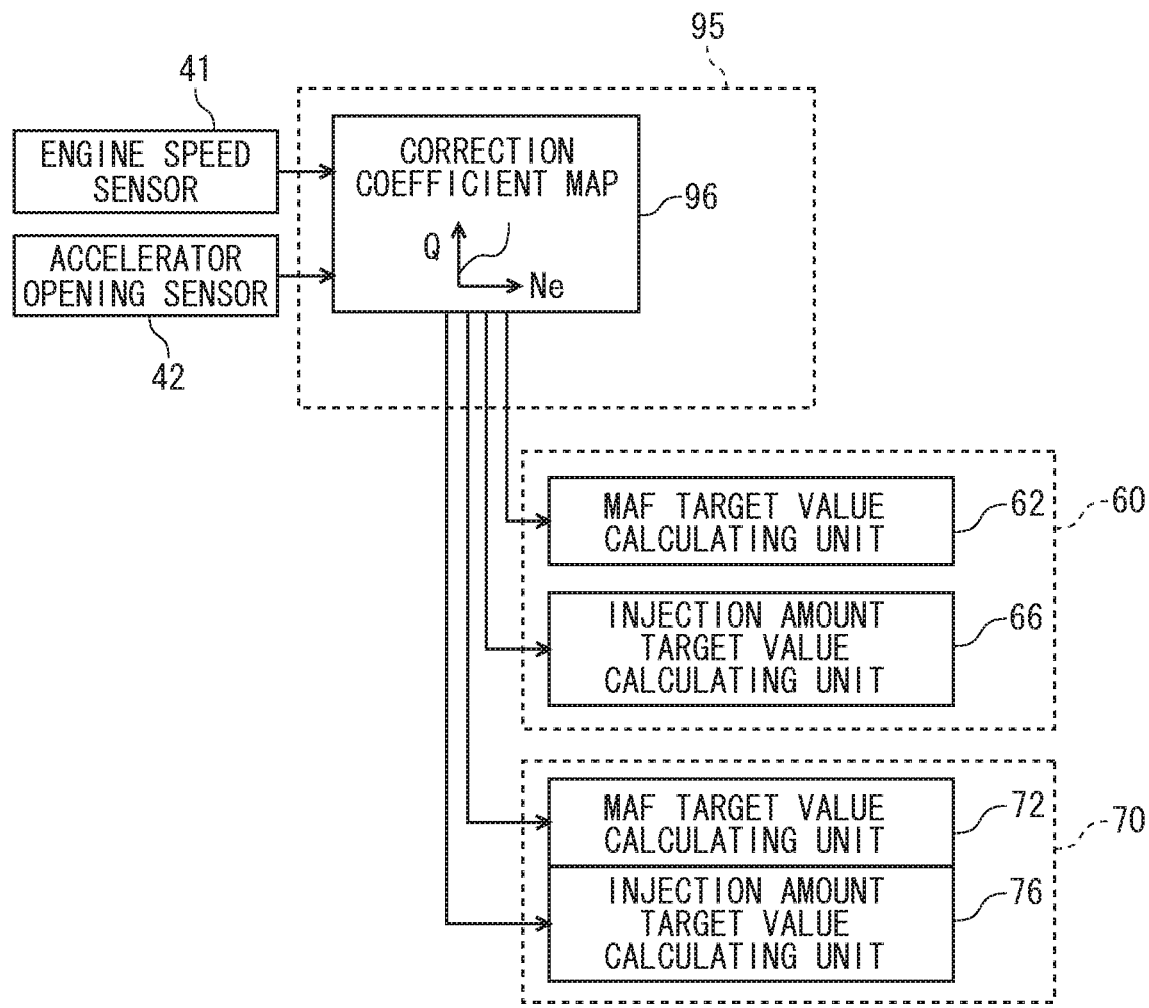
FIG. 12 is a block diagram illustrating a setting process of a MAF correction coefficient according to the embodiment.

FIG. 12 is a block diagram illustrating a setting process of the MAF correction coefficient $Maf_{\_corr}$ performed by the MAF correction coefficient calculating unit 95. A correction coefficient setting map 96 is a map based on the engine speed Ne and the accelerator opening Q, and the MAF correction coefficient $Maf_{\_corr}$ indicating the sensor property of the MAF sensor 40 corresponding to the engine speed Ne and the accelerator opening Q is set based on an experiment and the like in advance.

The MAF correction coefficient calculating unit 95 reads the MAF correction coefficient $Maf_{\_corr}$ from the correction coefficient setting map 96 using the engine speed Ne and the accelerator opening Q as input signals, and transmits the MAF correction coefficient $Maf_{\_corr}$ to the MAF target value calculating units 62 and 72 and the injection amount target value calculating units 66 and 76. Accordingly, the sensor property of the MAF sensor 40 can be effectively reflected to set the MAF target value $MAF_{SPL\_Trgt}$ or the target injection amount $Q_{SPR\_Trgt}$ at the time of the SOx purge control and the MAF target value $MAF_{NPL\_Trgt}$ or the target injection amount $Q^{NPR\_Trgt}_{NPL\_Trgt}$ at the time of the NOx purge control.

<Others>

The present invention is not limited to the above-described embodiment, and the invention may be modified appropriately without departing from the spirit and scope of the invention.

This application is based upon and claims the benefit of priority from Japanese Patent Application No. 2015-041798, filed Mar. 3, 2015, the entire contents of which are incorporated herein by reference.

INDUSTRIAL APPLICABILITY

The exhaust purification system and the catalyst regeneration method according to the present invention have an effect of effectively suppressing prolongation of the time required for SOx purge and preventing deterioration in fuel consumption and an excessive temperature rise of the exhaust gas, and are useful in that the exhaust gas discharged from an internal combustion engine is effectively purified.

REFERENCE SIGNS LIST

10: engine
11: injector
12: intake passage
13: exhaust passage
16: intake throttle valve
24: EGR valve
31: oxidation catalyst
32: NOx occlusion reduction type catalyst
33: filter
34: exhaust pipe injection device
40: MAF sensor
45: NOx/lambda sensor
50: ECU

The invention claimed is:

1. An exhaust purification system comprising:
an NOx occlusion reduction catalyst that is provided in an exhaust passage of an internal combustion engine to purify a nitrogen compound in an exhaust gas;
an intake aft amount detector that detects an actual intake aft amount of the internal combustion engine; and
a controller configured to:
perform an SOx purge control for recovering the NOx occlusion reduction catalyst from SOx-poisoning, using in combination both of: an air system control in which a target intake air amount necessary for lowering the exhaust gas to a predetermined first target excess air ratio is set based on an operating state of the internal combustion engine and an intake air amount of the internal combustion engine is feedback-controlled based on the target intake aft amount; and an injection system control in which a target injection increase amount necessary for lowering the exhaust gas to a predetermined second target excess aft ratio is set based on the target intake aft amount and a fuel injection amount is feedback-controlled based on the target injection increase amount;
prohibit execution of the SOx purge control according to the operating state of the internal combustion engine; and
execute, during a period in which the SOx purge control is prohibited, a catalyst warming control in which an air system of the internal combustion engine is open-loop controlled, the fuel injection amount is controlled, and thus the exhaust gas is maintained at a predetermined temperature,
wherein the controller is further configured to execute, when starting the SOx puree control after execution of the catalyst warming control has ended, the injection system control by switching the target intake air amount, used for setting the target injection increase amount, to the actual intake aft amount detected by the intake aft amount detector.

2. The exhaust purification system according to claim 1, wherein the controller is further configured to execute an NOx purge control for reducing and purifying NOx occluded in the NOx reduction catalyst using the air system control and the injection system control in combination, and sets the target injection increase amount of the injection system control based on the target intake air amount in the case of executing the NOx purge control.

3. An exhaust purification system comprising:
an NOx occlusion reduction catalyst that is disposed in an exhaust passage of an internal combustion engine to occlude and reduce a nitrogen compound contained in an exhaust gas discharged from the internal combustion engine;
an aft flow sensor that detects an actual intake air amount of the internal combustion engine; and
a controller that controls an air-fuel ratio of the exhaust gas discharged from the internal combustion engine, wherein the controller operates to execute a series of processes comprising:
a catalyst regeneration process which performs an SOx purge control for recovering the NOx occlusion reduction catalyst from SOx-poisoning, using in combination both of: an air system control in which a target intake air amount, necessary for lowering the exhaust gas to a predetermined first target excess air ratio is set based on an operating state of the internal combustion engine and an intake aft amount of the internal combustion engine is feedback-controlled based on the target intake air amount; and an injection system control in which a target injection increase amount, necessary for lowering the exhaust gas to a predetermined second target excess air ratio is set based on the target intake aft amount and a fuel injection amount is feedback-controlled based on the target injection increase amount;
a prohibition process that prohibits execution of the SOx purge control according to the operating state of the internal combustion engine; and
a catalyst warming process that executes, during a period in which the SOx purge control is prohibited by the prohibition process, a catalyst warming control in which an air system of the internal combustion engine is open-loop controlled, the fuel injection amount is controlled, and thus the exhaust gas is maintained at a predetermined temperature, and
wherein, when the catalyst regeneration process is executed after execution of the catalyst warming process has ended, the controller executes the injection system control by switching the target intake air amount, used for setting the target injection increase amount, to the actual intake air amount detected by the air flow sensor.

4. A catalyst regeneration method in an exhaust purification system including an NOx occlusion reduction catalyst that is disposed in an exhaust passage of an internal combustion engine to occlude and reduce a nitrogen compound contained in an exhaust gas discharged from the internal combustion engine, the method comprising:
a catalyst regeneration process which performs an SOx purge control for recovering the NOx occlusion reduction catalyst from SOx-poisoning, using in combination both of: an air system control in which a target intake aft amount, necessary for lowering the exhaust gas to a predetermined first target excess aft ratio is set based on an operating state of the internal combustion engine and an intake air amount of the internal combustion engine is feedback-controlled based on the target intake aft amount; and an injection system control in which a target injection increase amount, necessary for lowering the exhaust gas to a predetermined second target excess air ratio is set based on the target intake air amount and a fuel injection amount is feedback-controlled based on the target injection increase amount;
a prohibition process that prohibits execution of the SOx purge control according to the operating state of the internal combustion engine; and
a catalyst warming process that executes, during a period in which the SOx purge control is prohibited by the prohibition process, a catalyst warming control in which an aft system of the internal combustion engine is open-loop controlled, the fuel injection amount is controlled, and thus the exhaust gas is maintained at a predetermined temperature,
wherein, when the catalyst regeneration process is executed after execution of the catalyst warming process has ended, the injection system control is executed by switching the target intake aft amount, used for setting the target injection increase amount, to the actual intake air amount detected by an air flow sensor.

* * * * *